United States Patent
Liu et al.

(10) Patent No.: US 11,748,244 B2
(45) Date of Patent: Sep. 5, 2023

(54) REGRESSION TESTING FOR WEB APPLICATIONS

(71) Applicant: International Business Machines Corporation, Armonk, NY (US)

(72) Inventors: Pei Jian Liu, Beijing (CN); Bing Hua Zhao, Beijing (CN); Na Liu, Xi'an (CN); Yan Liu, Beijing (CN); Mei Rui Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/551,345

(22) Filed: Dec. 15, 2021

(65) Prior Publication Data

US 2023/0185701 A1     Jun. 15, 2023

(51) Int. Cl.
*G06F 11/36* (2006.01)
*G06N 5/04* (2023.01)
*G06N 5/022* (2023.01)

(52) U.S. Cl.
CPC ...... *G06F 11/3688* (2013.01); *G06F 11/3608* (2013.01); *G06F 11/3664* (2013.01); *G06N 5/022* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 7,984,015 B2 * | 7/2011 | Dias | G06F 16/2379 709/248 |
| 9,037,915 B2 * | 5/2015 | D'Alterio | G06F 11/3692 717/134 |
| 10,346,295 B2 * | 7/2019 | Beyel, III | G06F 11/3688 |
| 2018/0165599 A1 * | 6/2018 | Pete | G06N 5/02 |
| 2021/0314242 A1 * | 10/2021 | Majumder | H04L 43/0852 |

OTHER PUBLICATIONS

Abbasi, "Deep Learning for Network Traffic Monitoring and Analysis (NTMA): A Survey", 2021, Published by Elsevier B.V. (Year: 2021).*
Jayathilaka et al., "Performance Monitoring and Root Cause Analysis for Cloud-hosted Web Applications," ACM, 2017 International World Wide Web Conference Committee (IW3C2), Apr. 2017, 10 pages, http://dx.doi.org/10.1145/3038912.3052649.

(Continued)

*Primary Examiner* — Hossain M Morshed
(74) *Attorney, Agent, or Firm* — Nathan M. Rau

(57) ABSTRACT

Training a predict model with network traffic and data change messages generated by an existing web application running in a production environment. The predict model being is trained to predict data changes resulted from API calls embodied in network traffic. A stream of network traffic of the existing web application is replayed with an upgraded version of the existing web application to generate real data changes. The stream of network traffic is applied to the predict model to generate predicted data change messages. The predicted data change messages are comparing with real data change messages representing the real data changes. One or more existing APIs is identified as being possibly functionally degraded based on any inconsistency of the predicted data change messages with the real data change messages.

15 Claims, 10 Drawing Sheets

(56) References Cited

OTHER PUBLICATIONS

Dviri, "Recording Production Traffic Using Service Workers," Oct. 22, 2019, 7 pages, https://blog.loadmill.com/recording-production-traffic-using-service-workers-b713d40d48bb.

"Move fast without breaking things," GoReplay, May 11, 2021, 6 pages, htttps://goreplay.org.

Heger et al., "Automated Root Cause Isolation of Performance Regressions during Software Development," ACM, ICPE'13, Apr. 21-24, 2013, Prague, Czech Republic, 12 pages.

Zhou et al., "Distance Based Root Cause Analysis and Change Impact Analysis of Performance Regressions," Hindawi Publishing Corporation, Mathematical Problems in Engineering, vol. 2015, Article ID 690829, May 11, 2015, 10 pages, http://dx.doi.org/10.1155/2015/690829.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

REGRESSION TESTING FOR WEB APPLICATIONS

BACKGROUND

The present invention relates to software application test, and more specifically, to regression testing of web applications.

Web applications are widely used in different fields such as business. In the development of a web application, developers may periodically release upgrades to the web application due to bug fixes and enhancements. An upgraded version of the web application may contain code modifications to its previous version. The code modifications may include new codes that correct bugs, enhance existing functions, define new functions or modules and so on.

SUMMARY

According to one embodiment of the present invention, there is provided method for regression testing. According to another embodiment of the present invention, there is provided a computer system. The computer system comprises one or more processors, a memory coupled to the one or more processors; and a set of computer program instructions stored in the memory and executed by the one or more processors to implement a method. According to still another embodiment of the present disclosure, there is provided a computer program product. The computer program product comprises a computer readable storage medium having program instructions embodied therewith, wherein the program instructions are executable by one or more processors to implement a method.

The method comprises training a predict model with network traffic and data change messages generated by an existing web application running in a production environment, the predict model being trained to predict data changes resulted from API calls embodied in network traffic. The method further comprises replaying a stream of network traffic of the existing web application with a web application under test thus generating real data changes, wherein the web application under test is an upgraded version of the existing web application. The method comprises applying, by one or more processing units, the stream of network traffic to the predict model to generate predicted data change messages. The method further comprises comparing the predicted data change messages with real data change messages representing the real data changes and identifying one or more existing APIs as being possibly functionally degraded based on any inconsistency of the predicted data change messages with the real data change messages.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Through the more detailed description of some embodiments of the present disclosure in the accompanying drawings, the above and other objects, features, and advantages of the present disclosure will become more apparent, wherein the same reference generally refers to the same components in the embodiments of the present disclosure.

Figure 1:
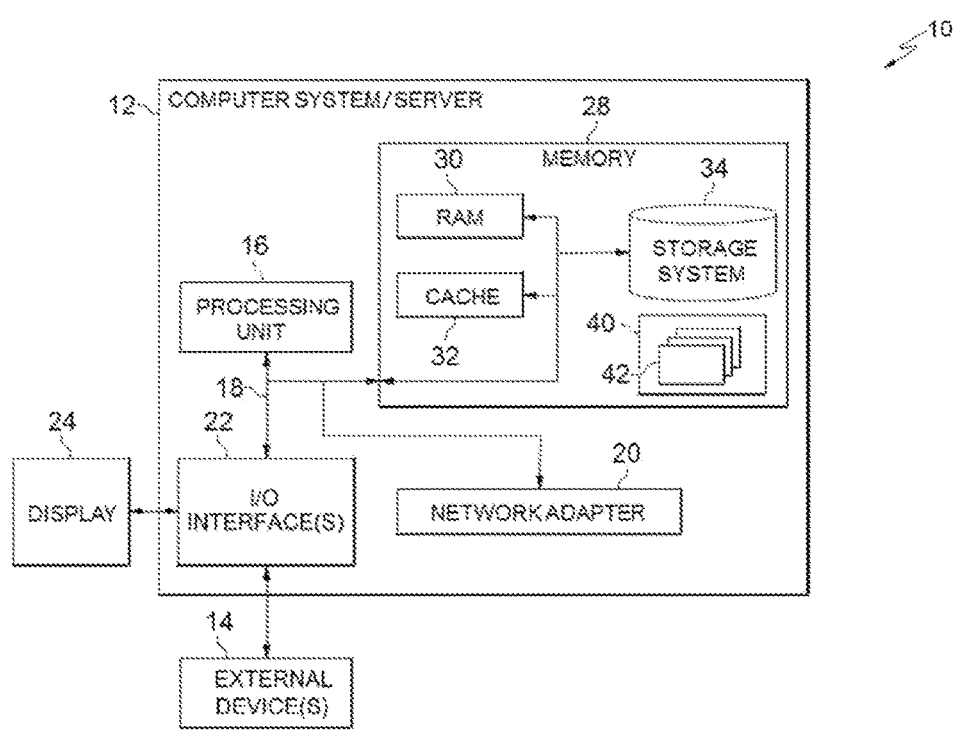
FIG. 1 depicts a cloud computing node according to an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
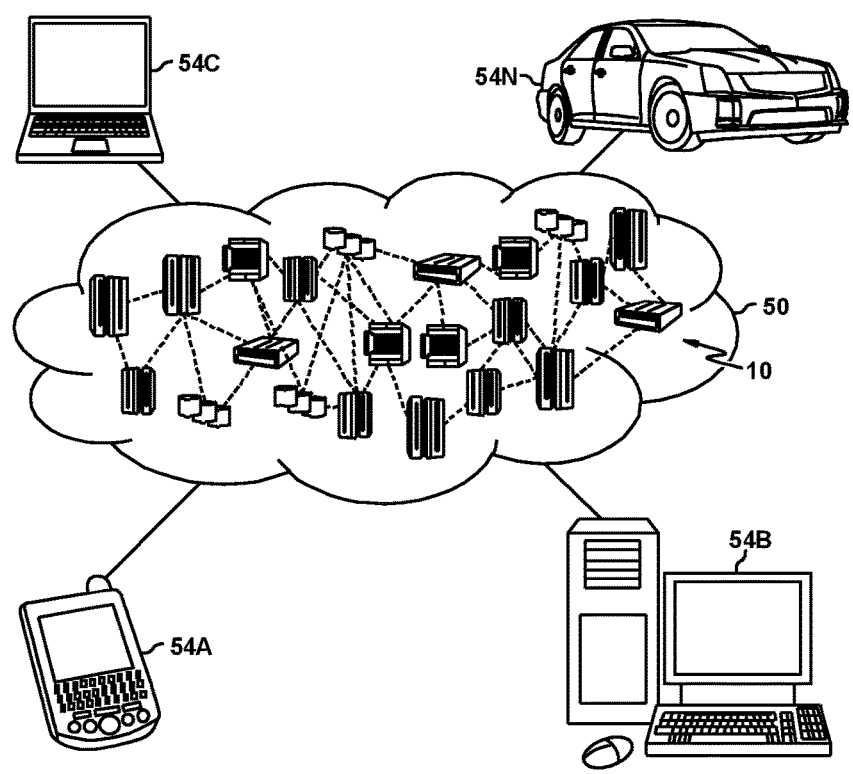
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
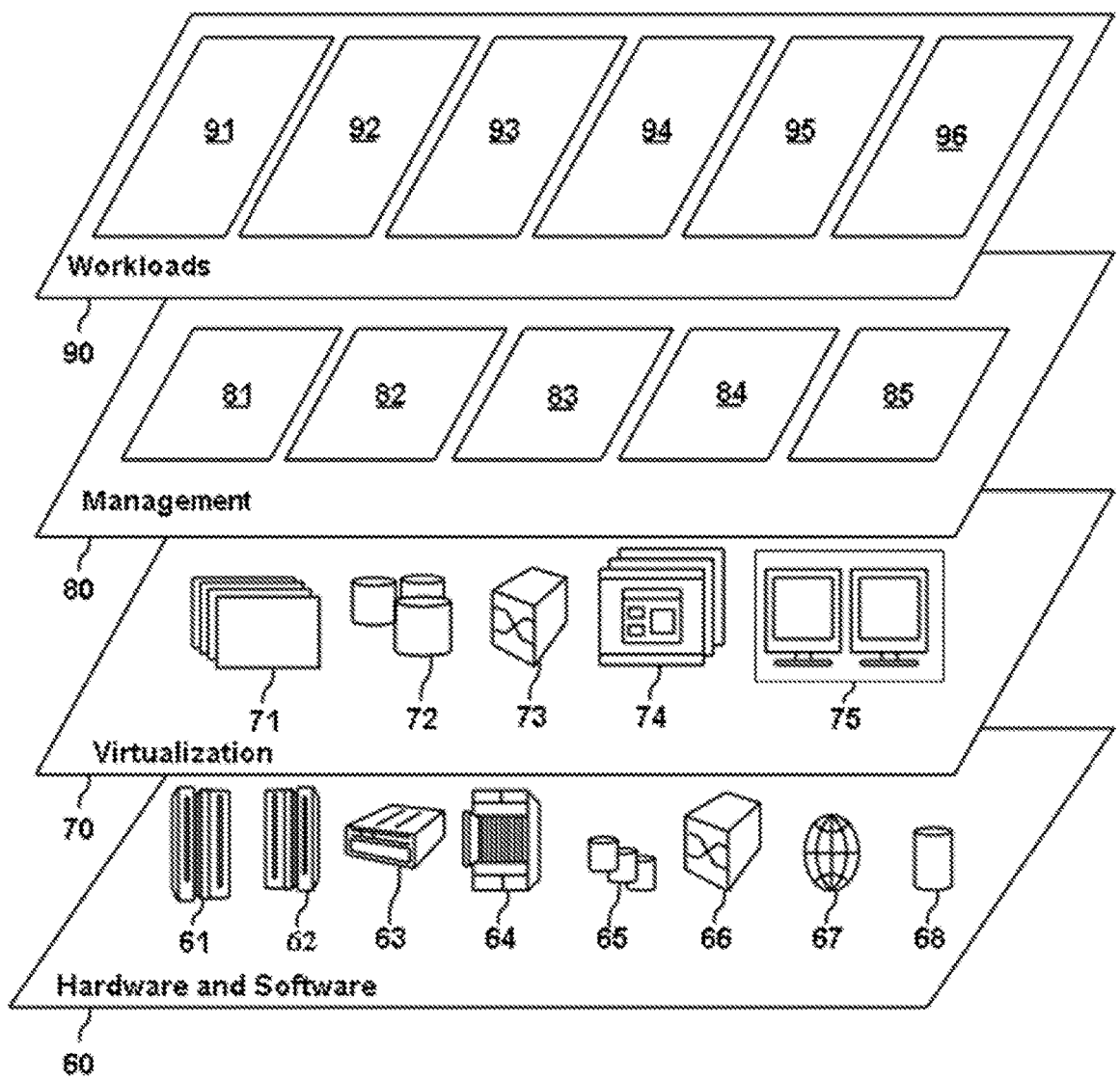
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and regression testing for web applications 96.

Due to the frequent change of the web application, regression testing is a key factor in successful release of new versions in the lifecycle of the web application. Regression testing is a kind of software test to uncover performance problems and functional problems of the upgraded version. One purpose of regression test is uncovering functional degeneration that may be caused by the code modifications in the upgraded version. The term functional degradation refers to the scenario that existing software functions or modules in the previous version degenerate from normal working state to abnormal working state in the upgraded version. APIs (Application Program Interfaces) in web applications may be subject to such functional degradation.

One of the purposes of regression testing of web applications is to identify functional degradation that may be caused by the upgrading of the web applications. Web applications typically implement application programming interfaces. An application programming interface (API) is a type of software interface, offering a service to other pieces of software and thus may serve as a connection between computers or between computer programs. An API is often made up of different parts which act as tools or services that are available to programmers. A program or a programmer that uses one of these parts is said to call that portion of the API. The calls that make up the API are also known as subroutines, methods, or requests, etc. As APIs are also subject to functional degradation, one task of regression testing is targeting at APIs in an existing web application to see whether they are degenerated from normal working state to abnormal working state in the upgraded version. To perform regression testing of APIs in a web application, normally it is needed to designing regression test cases to simulate API requests or API calls using test data and verify responses to the calls in different scenarios covering a real production environment. As web applications become larger and larger, the number of functions grows, and so does the number of needed regression test cases. It is a challenging task to provide regression test cases that cover all scenarios of production environments.

In view of the above, a method for regression testing of APIs in a web application is proposed herein. The method leverages network traffic of production environment and corresponding data change messages to detect functional degradation of APIs.

Figure 4A:
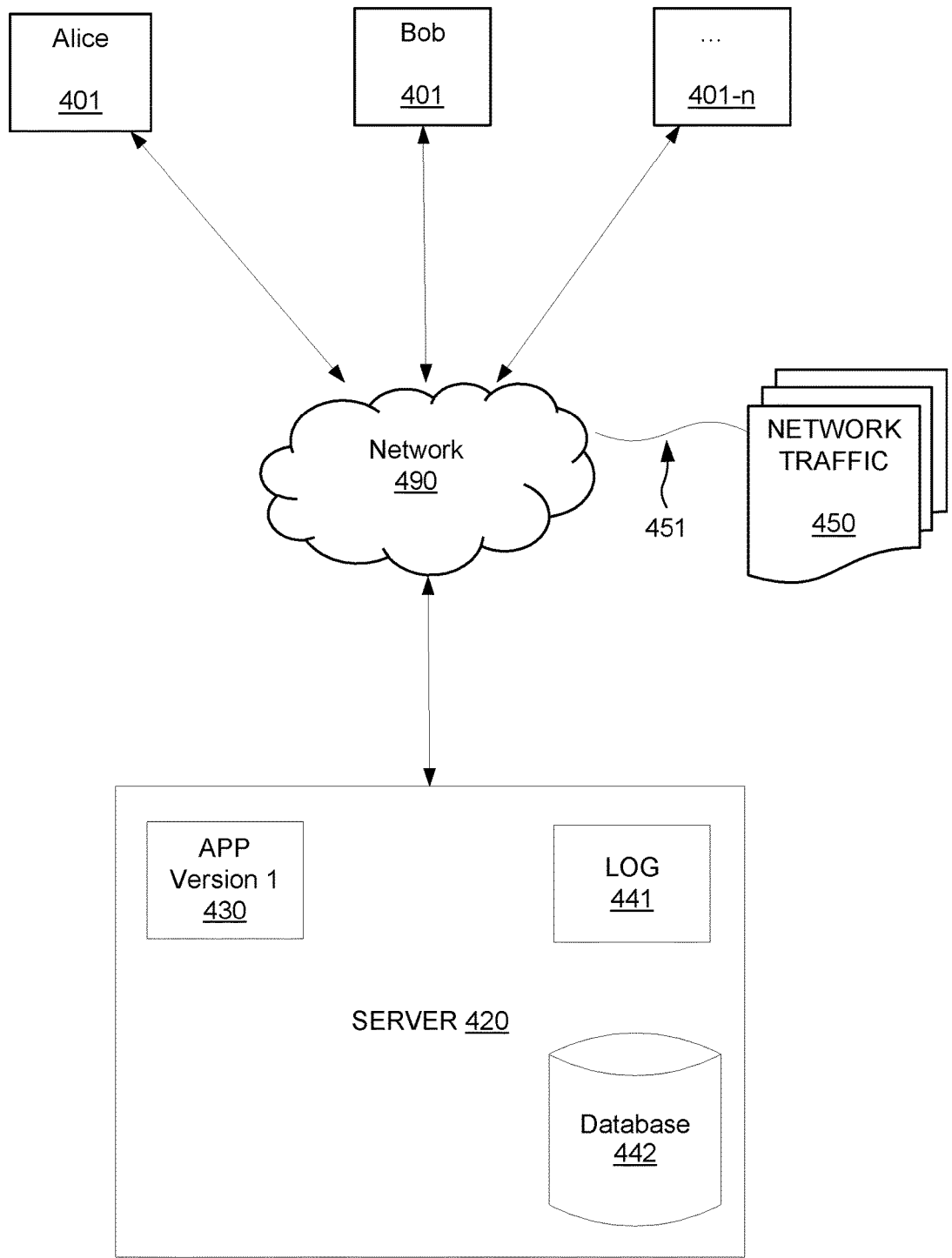
FIG. 4A depicts a production environment in which embodiments of according to the present disclosure may be implemented.

With reference to FIG. 4A to FIG. 7, embodiments of the invention will be described. First, refer to FIG. 4A, which depicts a production environment in which embodiments according to the present disclosure may be implemented. FIG. 4A shows a server 420 hosting a web application APP 430. For example, the APP 430 is a server-side application implementing online shopping services. FIG. 4A shows a number of clients 401 configured with client-side applications for users, Alice, Bob, etc., to access, via a network 490. The clients may view an online resource (not depicted) provided by the APP 430 (e.g., an online shopping site). The server 420 may be embodied as a server 12 (FIG. 1) implemented as a cloud computing node 10 (FIG. 2). The clients 401 may be representative of computing devices in the production environment and may be embodied as any of computing devices 54A-N (FIG. 2). Further, the APP 430 may be embodied as a programing module 42 (FIG. 1).

Figure 4B:
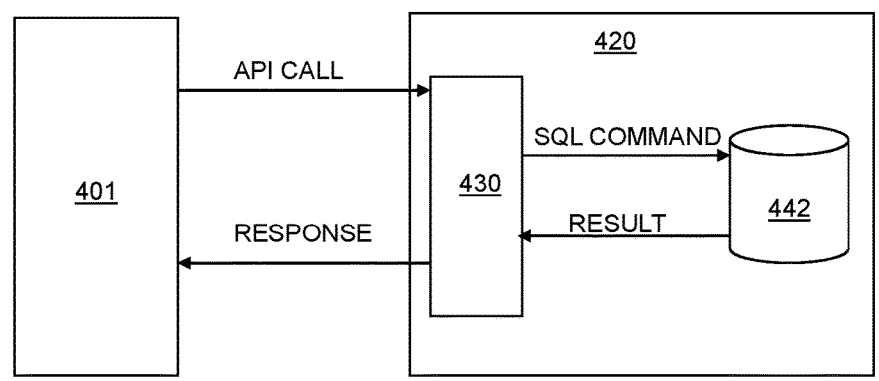
FIG. 4B illustrates an API call in the production environment.

As denoted above, an API may serve as a software intermediary that allows two software modules to interact with each other, allowing communication between the clients 401 and the server 420 via the network. For example, when Alice at a client 401 places an order on a webpage of the online shopping site, the client-side application at the client will access a service provided by the server-side application at the server 420, leading to database operations to create a new record in the database 442. In another example, when Bob at a client 401 makes a change to an order on a webpage of the online shopping site, the client-side application at the client will access a service provided by the server-side application at the server 420, leading to database operations to change a value in a record in the database 442. As shown in FIG. 4B, generally, a software module at a client 401 may request a service provided by a web application (e.g., APP 430) at the server 420 via an API call. The API call may lead to database operations, for example, by executing a SQL command with respect to the database 442. Result of the database operations may be returned and in turn transformed to a response to the API call.

Back to FIG. 4A, API calls may be embodied within data packets in network traffic 450 generated from web applications, such as provided by the APP 430. The network traffic 450 may be captured, as indicated by an arrow line 451, and stored as files. APIs calls may cause corresponding data changes, such as data changes in the database 442. In the context of the invention, information on the data changes is referred to as data change messages. Data change messages may be represented by data operation commands, such as SQL commands that are recorded in and retrievable from a system log 441.

Network traffic of web applications may be replayed later under emulated conditions. According to embodiments of the invention, the network traffic 450 may be replayed under a test environment for regression testing as further described below.

It is noted that, in FIG. 4A, the APP 430 is shown to be of version 1. The APP 430 may be upgraded later to a new version, for example, version 2. Before the upgraded version is released online, regression testing for the new version will be performed to identify possible functional degeneration of existing functions, for example, APIs. To avoid confusion in the description below, hereinafter, the APP of version 2 may also be referred to as "current web application" or "web application under test", and the APP 430 of version 1 may be referred to as "previous application" or "existing application".

Figure 5A:
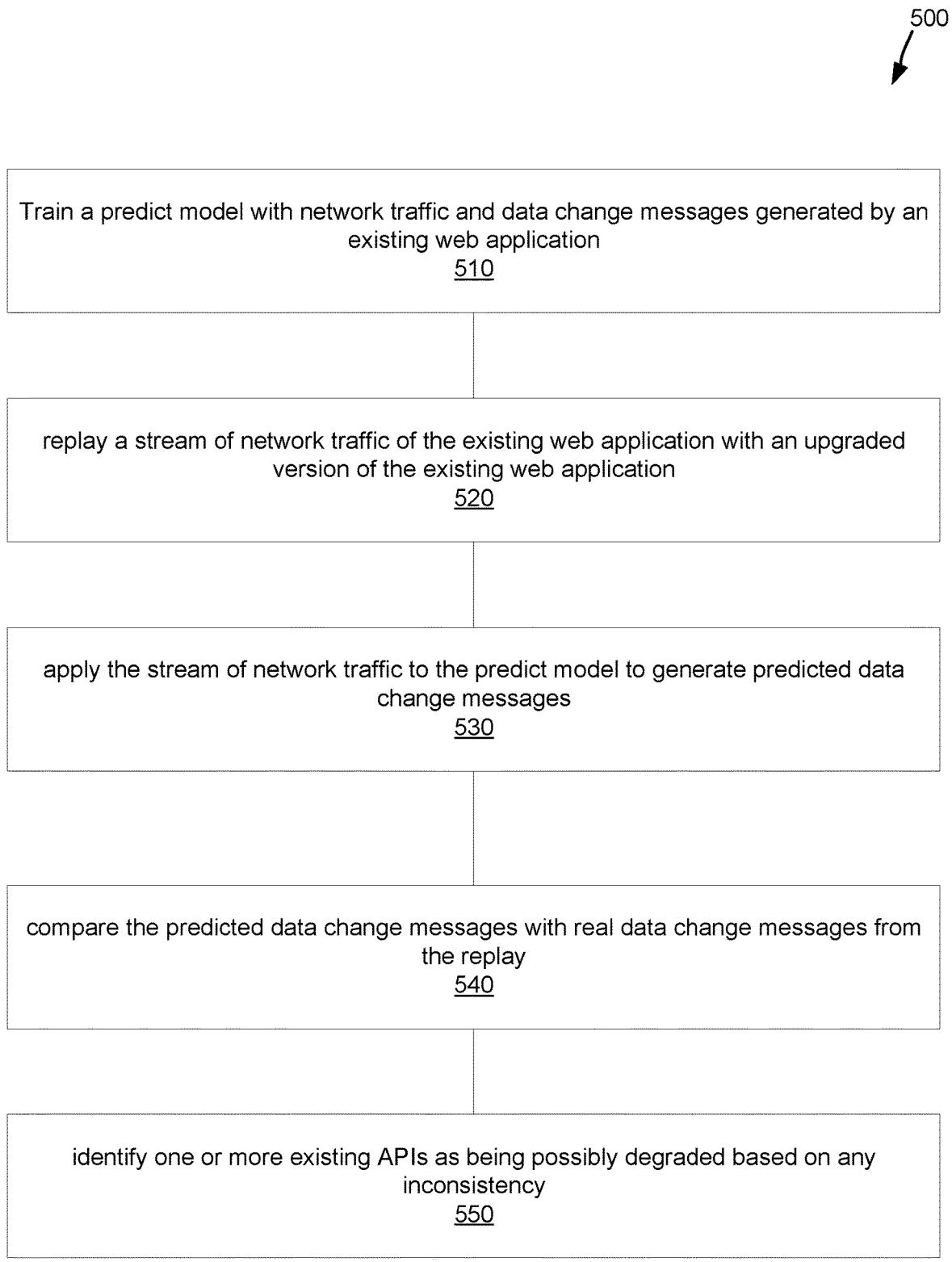
FIG. 5A depicts an overall process flow of a computer-implemented method according to an embodiment of the present disclosure.

Referring to FIG. 5A, which depicts an overall process flow of a method 500 for regression testing according to some embodiments of the present disclosure. As shown, the method 500 generally comprises the following operations that may be performed by one or more processing units: training a predict model with network traffic and data change messages generated by an existing web application running in a production environment, the predict model being trained to predict data changes resulted from API calls embodied in network traffic (block 510); replaying a stream of network traffic of the existing web application with a web application under test thus generating real data changes, wherein the web application under test is an upgraded version of the existing web application (block 520); applying the stream of network traffic to the predict model to generate predicted data change messages (block 530); comparing the predicted data change messages with real data change messages representing the real data changes (block 540); and identifying one or more existing APIs as being possibly functionally degraded based on any inconsistency of the predicted data change messages with the real data change messages (block 550).

Initially, at block 510, a predict model may be trained with network traffic and data change messages as training data. The network traffic and data change messages were generated by an existing web application running in a production environment. For example, the network traffic may be the network traffic 450 or a segment of the network traffic 450 as depicted in FIG. 4A. The data change messages may be retrieved from in the log 441. The network traffic 450 and the data change messages in the log 441 were generated by the APP 430 when it was running in a production environment as shown in FIG. 4A. The predict model is trained to predict data changes caused by API calls in network traffic.

Operations at block 510 may, in some embodiments, leverage machine learning. Machine learning may include the study of algorithms and statistical models that computer systems use to perform a specific task without using explicit instructions; instead, relying on patterns and inference. As a subset of artificial intelligence, machine learning methods or algorithms build a mathematical model based on sample data, or training data, in order to make predictions or decisions without being explicitly programmed to perform the task. According to an embodiment of the invention, at block 510, the predict model may be trained with a suitable machine learning method. As discussed above, API calls lead to data changes. Therefore, history information of API calls and corresponding information on data changes may be used as training data by the machine learning method to train a model to understand the pattern of the association of the API invocations with data change messages. With the understanding of the pattern, the trained model will be able to predict data changes for given API calls. Suitable machine learning methods for training the predict model include Recurrent Neural Networks (RNN) for processing sequential data. For example, Long Short-Term Memory (LSTM) is a kind of RNN algorithm which may be employed to construct predict models, and thus may be used for training the predict model at block 510.

Figure 6A:
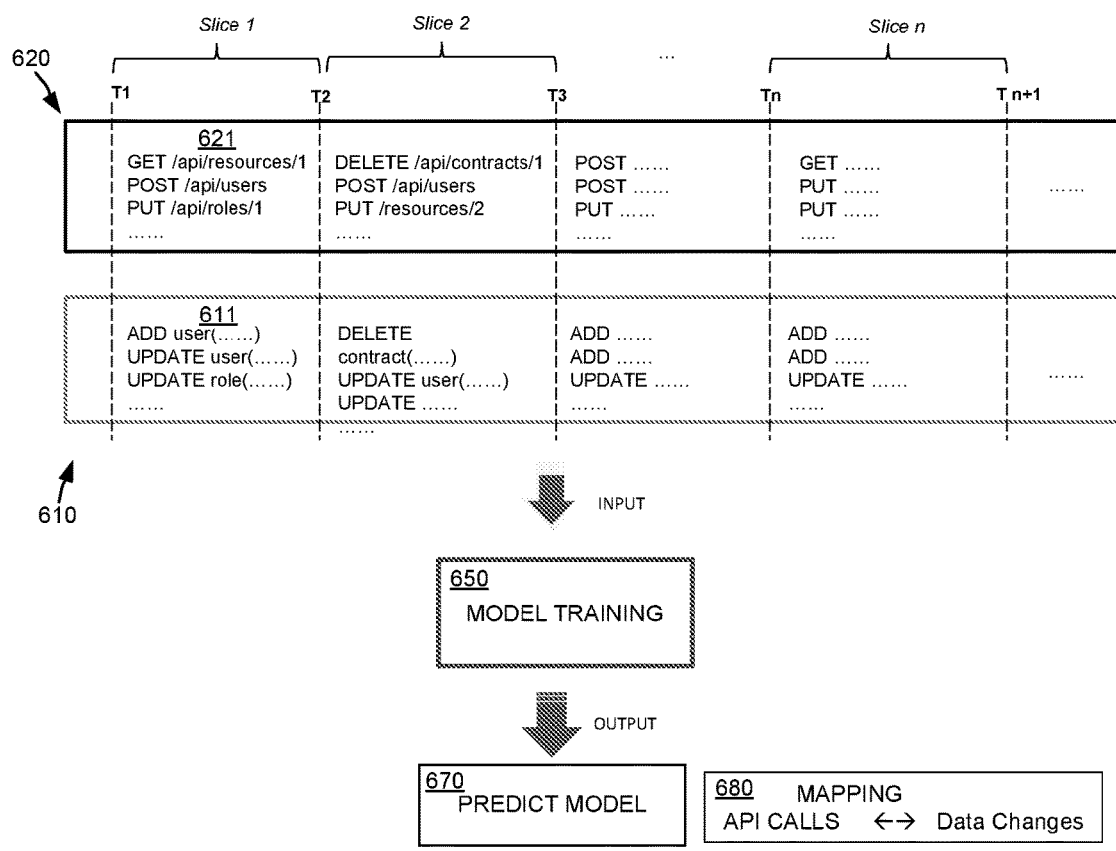
FIG. 6A illustrates a process of model training according to an embodiment of the present disclosure.

Turn to FIG. 6A, which illustrates a process of model training according to an embodiment of the present. FIG. 6A depicts network traffic 620 and data change messages 610. The network traffic 620 may be a segment of network traffic 450 from one point of time $T_1$ to another point of time $T_{n+1}$. The duration may be in days or even months. The data change messages 610 may be a segment of data change messages of the same period of time as the network traffic 620 that may be obtained from the log 441. FIG. 6A also depicts a model training module 650 implementing a suitable machine learning method. The model training module 650 takes network traffic 620 and data change messages 610 as input and constructs a predict model 670 as output.

According to an embodiment of the invention, the network traffic 620 and the data change messages 610 may be divided into time-sliced pieces, slice 1 ($T_1$-$T_2$), slice 2 ($T_2$-$T_3$) . . . , slice n ($T_n$-$T_{n+1}$). Each of the time-sliced pieces comprises two parts in pair. The $1^{st}$ part comprises one or more API calls and the $2^{nd}$ part comprises corresponding data change messages. FIG. 6A illustrates that, for slice 1, the $1^{st}$ part comprises API calls, GET/api/resources/1, POST/api/users, PUT/api/roles/1. The API calls are also referred to as API requests and may be parsed out from the network traffic. The $2^{nd}$ part comprises data change messages ADD user( . . . ), UPDATE user( . . . ), UPDATE role( . . . ). The data change messages illustrated here are SQL commands that may be obtained from the log 441.

In some embodiments, the number of API calls per unit time embodied in network traffic of high concurrency web applications is higher than that of low concurrency web applications. Thus, according to an embodiment of the inventions, the network traffic 620 and the data change messages 610 may be divided so that there are as few API calls as possible in a time sliced piece, taking into consideration of the concurrency level of the web application.

It is to be noted that the format of the API calls is implementation dependent and thus may vary depending on different API specifications. Similarly, the format of data change messages is implementation dependent. Further, the data change messages may include not only database operation commands that change database data, but also data file operation commands that change data in data files.

The time-sliced pieces slice 1, slice 2 . . . , slice n are used as training data by the model training module 650 to train a predict model in a relevant manner. The training process may involve iterative operations in which the two parts in pair of respective slice 1, slice 2 . . . , slice n will be iteratively input to the model training module 650. The model training module 650 may feed the paired parts to the predict model 670 for it to learn the pattern of the association of API calls and data change messages, until the predict model 670 is able to receive network traffic and predict data changes corresponding to API calls comprised in the network traffic with satisfying confidence. As a side product, the training process may also output a mapping 680 of the association relationship of API calls with data change messages.

Figure 6B:
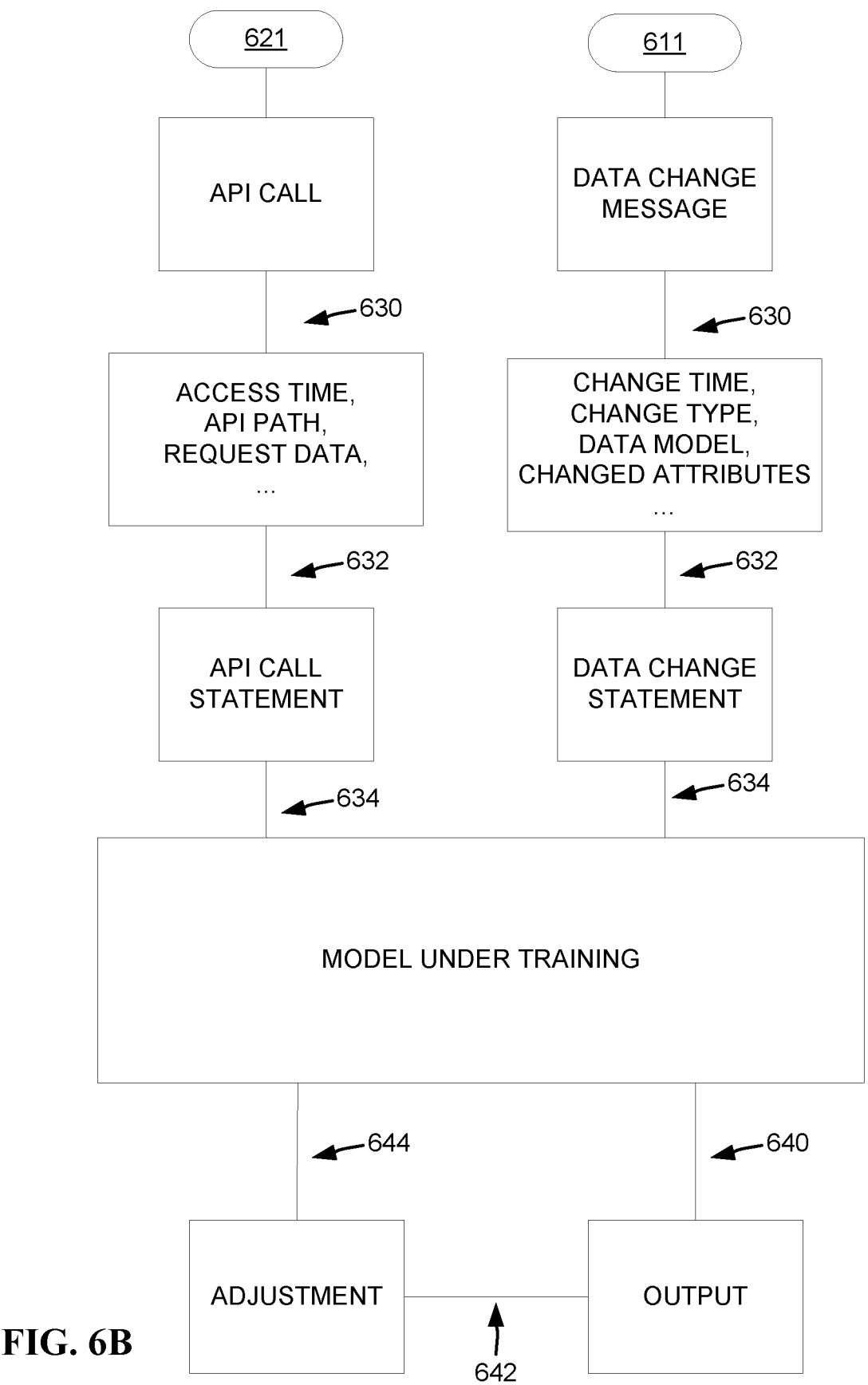
FIG. 6B depicts an example process for training model according to an embodiment of the invention

Turn to FIG. 6B, which depicts an example process of training the predict model according to an embodiment of the invention. Specifically, the process may be performed by the model training module 650 in the following manner.

At 630, upon receiving two parts in pair of a time-sliced piece, for example, slice 1, the API calls in the $1^{st}$ part 621 are parsed into API descriptions in terms of access time, API path, request data, etc., (e.g., based on API specification). Further, the data change messages in the $2^{nd}$ part 611 are parsed into data change descriptions in terms of change time, change type, data model, changed attributes, etc., (e.g., based on database specification). API calls are paired with respective data change messages according to the access time and the change time.

At 632, based on the API descriptions and the data change descriptions, the model training module 650 may further compose descriptive statements, such as API call statement "POST/api/users users(ID, name, email, mobile, roleid . . . )" and corresponding data change statement "ADD user (ID, name, email) of XX data source, UPDATE user_role(roleid) of yy-data-source".

At 634, the API call statements and corresponding data change statements may be fed to the model under training. Alternatively, the API descriptions and corresponding data change descriptions may be fed to the model under training.

At 640, after a certain amount of iterations, the model can understand the pattern of the relationship between API calls and data changes and output prediction results.

At 642, the results may be verified to test the confidence of the model.

At 644, Adjustment may be made to parameters of the training algorithm based on the feedback from 642.

The training process may be repeated until the confidence of the model reaches a satisfying threshold.

The above description provides an illustrative but non-limiting example of implementations. It may be appreciated from the description that the implementation of the model training may be dependent on relevant domain knowledge such as API specifications and database specifications. As specific implementation is not the focus of the invention, further details in this respect will be omitted herein so as not to obscure the description of the invention.

Return to FIG. 5A. At block 520, a stream of network traffic of the existing web application 430 is replayed with a web application under test (730, FIG. 7) thus generating real data changes, wherein the web application under test is an upgraded version of the existing web application.

Figure 7:
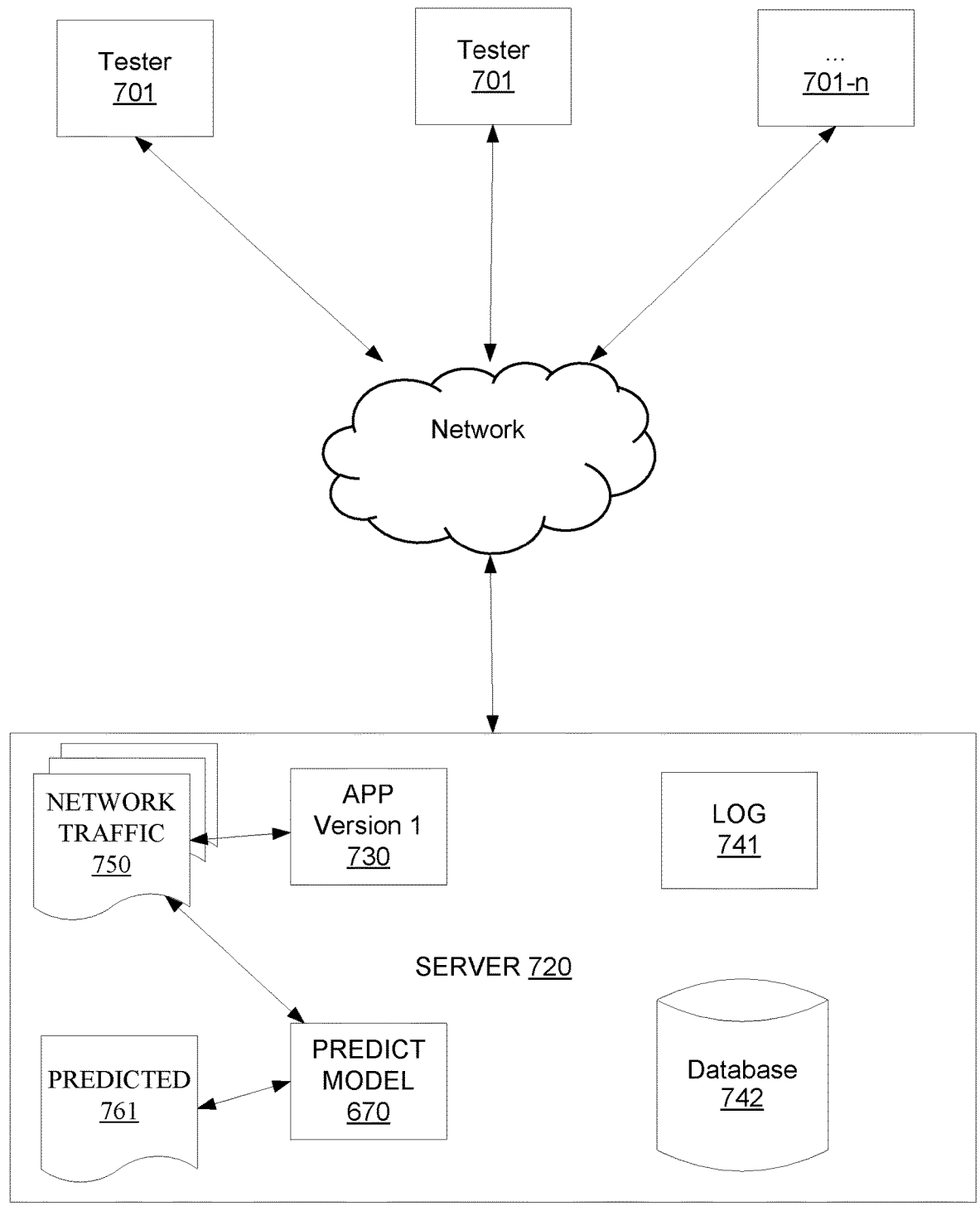
FIG. 7 depicts a test environment in which embodiments of according to the present disclosure may be implemented.

Refer to FIG. 7, which depicts a test environment in which embodiments of according to the present disclosure may be implemented. The test environment emulates the production environment of FIG. 4A, so configuration of the test environment may have certain similarities to the production system. For example, a sever 720 shown in FIG. 7 may be the same server as server 420, although it also may be a separate server. A number of clients 701, configured similarly to clients 401, may be used for testers to emulate operations of users to access the online shopping site via the network. Further, a system log 741 and a database 742 are configured to have the same functionality as the system log 441 and the database 442, respectively.

FIG. 7 shows a web application APP 730 under test. In other words, the APP 730 may be the object of the regression testing. For example, the APP 730 is an upgraded version (e.g., version 2) of the APP 430 shown in FIG. 4. FIG. 7 also shows network traffic 750. In an implementation, the network traffic 750 may comprise a part of the network traffic 450 as shown in FIG. 4. Alternatively, or in addition, the network traffic 750 may comprise a part of network traffic generated previously in testing an old version of the APP 730, for example, in testing the APP 430.

FIG. 7 shows the predict model 670 trained at block 510. As described above, the predict model 670 may be configured to receive network traffic and output predicted data change messages 761 corresponding to API calls embodied in the network traffic.

In operation at block 520, a stream of network traffic 750 of the web application APP 430 may be replayed with the APP 730 thus generating real data changes. As noted above, the network traffic 750 may comprise a part of the network traffic 450 as shown in FIG. 4. Alternatively, or additionally, the network traffic 750 may comprise a part of network traffic generated previously in testing an old version of the APP 730, for example, in testing the APP 430.

Network traffic replay may be a useful tool for many purposes in networking. Network traffic captured from live networks such as the production environment of FIG. 4A (when replayed with the APP 730 in the test environment of FIG. 7) can be used to generate background traffic and reproduce real network scenarios. For example, during network traffic replay with the APP 730 running in the test environment, all the packets in the files stored for the network traffic are received by the APP 730 in the same sequence as in the production environment. Thus, all API calls in the packets will be executed by the APP 730 under test, one by one according to the received time order, so that the APP 730 can produce corresponding responses, including corresponding data changes. The data changes are embodied in the data change messages, such as SQL commands for the database 742, that are recorded in the log 741. Therefore, replaying network traffic 750 with the APP 730 at block 520 may be equivalent to actual users, such as Alice and Bob at clients 401, helping testers at client 701 with the regression testing for the APP 730. If the existing APIs of the APP 430 are not functionally degraded due to upgrading to the APP 730, the data changes corresponding to API calls should be the same as the data changes generated by the existing APP 430 running in the production environment. Conversely, if the data changes in the test environment are not consistent with the data changes in the production environment, then it is likely that some corresponding APIs have suffered functional degradation.

To verify whether the data changes in the test environment are consistent with the data changes in the production environment, at block 530, the same stream of network traffic 750 may be applied to the predict model 670. The predict model 670 may be trained to output data change messages corresponding to API calls in network traffic with satisfying confidence. As a result, with the network traffic 750 as input, the predict model 670 is able to parse out API calls from the network traffic 750 and output predicted data change messages 761 corresponding to the API calls. The predicted data change messages 761 represent correct data changes that should occur in response to the API calls, as if no API were functionally degraded.

At block 540, the predicted data change messages are compared with real data change messages representing the real data changes. Real data change messages may be obtained from the log 741 (to check whether the real data changes are consistent with the predicted data change messages).

At block 550, one or more existing APIs may be identified as being possibly functionally degraded based on any inconsistency of the predicted data change messages with the real data change messages.

Figure 5B:
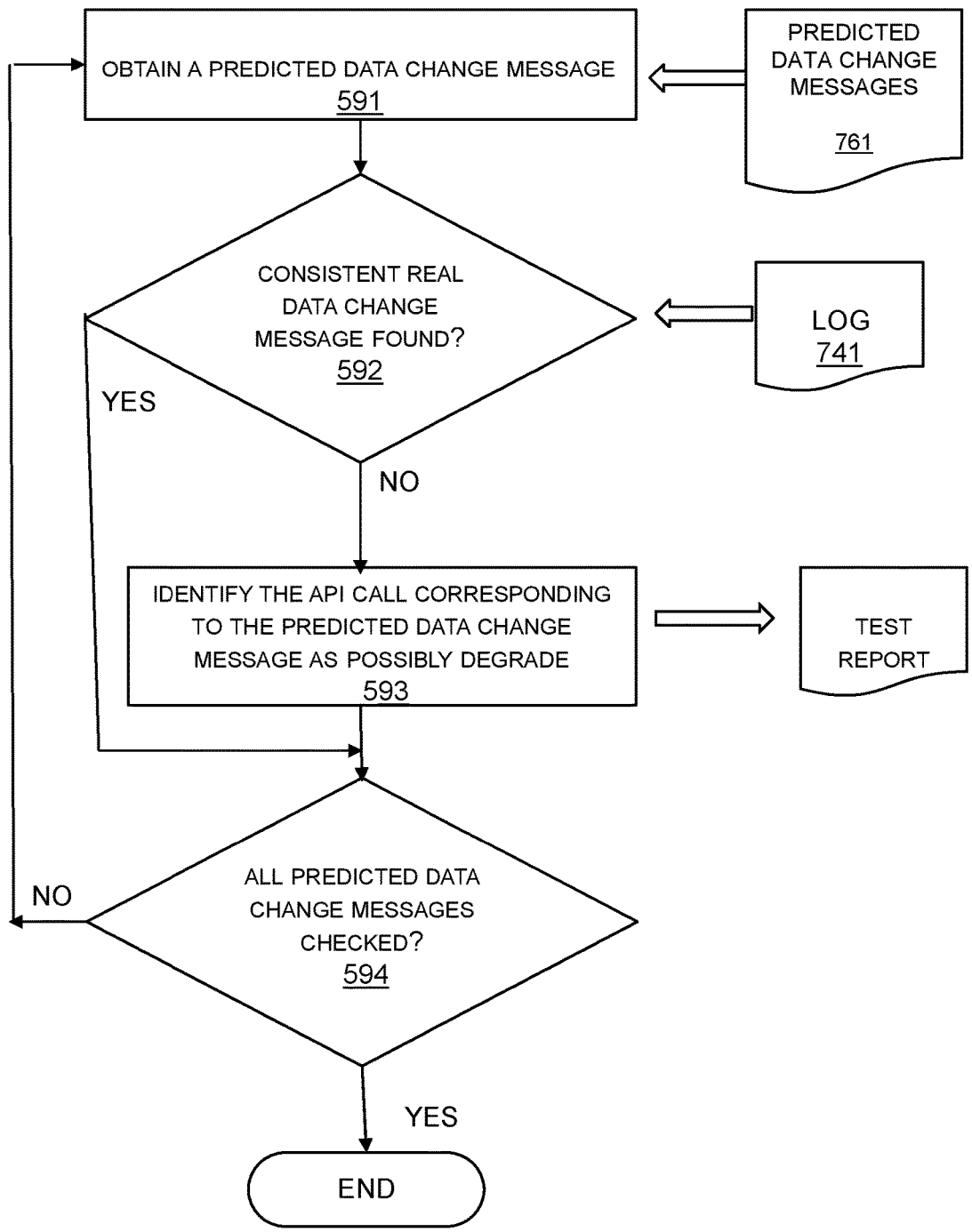
FIG. 5B depicts a flowchart of detailed operations of according to an embodiment of the present disclosure.

Turn to FIG. 5B, which depicts a flowchart of detailed operations at block 540 and 550. The operations begin at block 591, where a predicted data change message 761 is sequentially obtained from the predicted data change messages output by the predict model 670. At block 592, real data change messages in the log 741 are compared to the predicted data change message to see if there is a real data change message representing a real data change consistent with the predicted data change message. If yes, the process proceeds to block 594.

However, if there is not a consistent real data message, then the API call corresponding to the predicted data change messages is identified at block 593. The API call may be identified by looking up the mapping 680 of the association relationship of API calls with data change messages. Therefore, the API related to the API call may be identified as being possibly functionally degraded. The identified API may be recorded in a test report as a part of the regression testing.

The process then proceeds to query block 594 to see if all predicted data change messages have been checked. If not, the process proceeds to block 591 and above operations are repeated for the next predicted data change message. If all predicted data change messages have been checked, the process will end.

Description of embodiments of the method for regression testing have been provided. It can be appreciated from the above description that advantages of the invention may include leveraging of one or more artificial intelligence models and utilizing historical network traffic to realize efficient regression testing for APIs of web applications.

It should be noted that the processing of the method for regression testing according to embodiments of this disclosure could be implemented by computer, such as by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for regression testing comprising:
   training, by one or more processing units, a predict model with network traffic and data change messages generated by an existing web application running in a production environment, the predict model being trained to predict data changes resulted from API calls embodied in network traffic;
   replaying, by one or more processing units, a stream of network traffic of the existing web application with a web application under test thus generating real data changes, wherein the web application under test is an upgraded version of the existing web application;

applying, by one or more processing units, the stream of network traffic to the predict model to generate predicted data change messages;

comparing, by one or more processing units, the predicted data change messages with real data change messages representing the real data changes; and identifying, by one or more processing units, one or more existing APIs as being possibly functionally degraded based on any inconsistency of the predicted data change messages with the real data change messages.

2. The method of claim 1, wherein the training the predict model further comprises:

dividing, by one or more processing units, the network traffic and the data change messages into time-sliced pieces, each of the time-sliced pieces comprising one or more API calls and corresponding data change messages, wherein the time-sliced pieces are used as training data to train the predict model.

3. The method of claim 1, wherein the stream of network traffic is replayed in a test environment emulating the production environment.

4. The method of claim 1, wherein the stream of network traffic comprises a part of the network traffic generated by the existing web application in the production environment.

5. The method of claim 1, wherein the stream of network traffic comprises a part of the network traffic generated by the existing web application in a test environment.

6. A system for regression testing comprising:

one or more processors;

a memory coupled to the one or more processors; and a set of computer program instructions stored in the memory and executed by the one or more processors to implement a method comprising:

training a predict model with network traffic and data change messages generated by an existing web application running in a production environment, the predict model being trained to predict data changes resulted from API calls embodied in network traffic;

replaying a stream of network traffic of the existing web application with a web application under test thus generating real data changes, wherein the web application under test is an upgraded version of the existing web application;

applying the stream of network traffic to the predict model to generate predicted data change messages;

comparing the predicted data change messages with real data change messages representing the real data changes; and identifying one or more existing APIs as being possibly functionally degraded based on any inconsistency of the predicted data change messages with the real data change messages.

7. The system of claim 6, wherein the training the predict model further comprises:

dividing the network traffic and the data change messages into time-sliced pieces, each of the time-sliced pieces comprising one or more API calls and corresponding data change messages, wherein the time-sliced pieces are used as training data to train the predict model.

8. The system of claim 6, wherein the stream of network traffic is replayed in a test environment emulating the production environment.

9. The system of claim 6, wherein the stream of network traffic comprises a part of the network traffic generated by the existing web application in the production environment.

10. The system of claim 6, wherein the stream of network traffic comprises a part of the network traffic generated by the existing web application in a test environment.

11. A computer program product for regression testing, wherein the computer program product comprises a computer readable storage medium having program instructions embodied therewith, wherein the program instructions are executable by one or more processors to implement a method comprising:

training a predict model with network traffic and data change messages generated by an existing web application running in a production environment, the predict model being trained to predict data changes resulted from API calls embodied in network traffic;

replaying a stream of network traffic of the existing web application with a web application under test thus generating real data changes, wherein the web application under test is an upgraded version of the existing web application;

applying the stream of network traffic to the predict model to generate predicted data change messages;

comparing the predicted data change messages with real data change messages representing the real data changes; and identifying one or more existing APIs as being possibly functionally degraded based on any inconsistency of the predicted data change messages with the real data change messages.

12. The computer program product of claim 11, wherein the training the predict model further comprises:

dividing the network traffic and the data change messages into time-sliced pieces, each of the time-sliced pieces comprising one or more API calls and corresponding data change messages, wherein the time-sliced pieces are used as training data to train the predict model.

13. The computer program product of claim 11, wherein the stream of network traffic is replayed in a test environment emulating the production environment.

14. The computer program product of claim 11, wherein the stream of network traffic comprises a part of the network traffic generated by the existing web application in the production environment.

15. The computer program product of claim 11, wherein the stream of network traffic comprises a part of the network traffic generated by the existing web application in a test environment.

* * * * *